United States Patent Office 2,984,656
Patented May 16, 1961

2,984,656
POLYMERIZATION OF VINYL ALKYL ETHERS

Joginder Lal, Cuyahoga Falls, Ohio, assignor to The Goodyear Tire & Rubber Company, Akron, Ohio, a corporation of Ohio No Drawing. Filed Mar. 25, 1958, Ser. No. 723,646

16 Claims. (Cl. 260—91.1)

This invention relates to the process of polymerizing vinyl alkyl ethers. More particularly, it relates to the process of polymerizing vinyl alkyl ethers to form high molecular weight rubber-like polymers. It also relates to a catalyst to produce these polymers.

The polymerization of vinyl alkyl ethers by means of acid-reacting catalyst has been known for some time. However, the prior art discloses that when vinyl alkyl ethers are polymerized at temperatures above −10° C. by an acid-reacting catalyst such as tin-tetrachloride, stannous chloride, aluminum chloride, zinc chloride, boron trifluoride or its ether complex, sulfuric acid and hydrochloric acid, the addition polymers obtained are viscous, sticky masses of very low molecular weight. According to the prior art, if a high molecular weight rubber-like elastomeric form-stable polyvinyl alkyl ether is desired, using these acid reacting catalysts the temperature of polymerization must be kept below −10° C. and in some cases a tempertaure of −100° C. has been disclosed as being the desired polymerization temperature. In U.S. Patent 2,609,364 it is stated that the maintenance of a uniform temperature at or below −45° C. is critical to the formation of rubber-like products with acid-reacting catalysts. Therefore, in order to produce polymers of vinyl alkyl ethers that are high molecular weight and rubber-like in nature utilizing acid-reacting catalyst systems requires that the polymerization be carried out at extremely low temperatures which are expensive to maintain.

It is the object, therefore, of this invention to provide a method to polymerize the vinyl alkyl ethers to form high molecular weight rubber-like polymers without requiring extremely low polymerization temperatures. It is another object of this invention to provide a method of polymerizing vinyl alkyl ethers which is less expensive and by which more useful polyvinyl alkyl ethers may be produced: It is still another object of this invention to provide a catalyst which will polymerize vinyl alkyl ethers to high molecular weight polymers without requiring extremely low polymerization temperatures. Other objects will appear as the description proceeds.

It has been discovered that vinyl alkyl ethers may be polymerized to high molecular weight polymers without requiring extremely low polymerization temperatures by using, as a catalyst, the reaction product of a hydrated ferric sulfate and sulfuric acid.

In the preparation of this catalyst, depending upon the particular hydrate of ferric sulfate, the concentration and amount of sulfuric acid and the reaction conditions employed, it is possible to prepare various species of hydrated ferric hydrosulfate. A particularly useful catalyst for the polymerization of vinyl alkyl ethers has been prepared by reacting ferric sulfate hexahydrate and concentrated sulfuric acid. The analysis of the iron and sulfur content of this catalyst indicates that the overall composition corresponds to $$Fe_2(SO_4)_3 \cdot H_2SO_4 \cdot XH_2O$$

wherein X is equal to 3 or 4.

It has been observed, by using this catalytic system to polymerize vinyl alkyl ethers, high molecular weight polyvinyl alkyl ethers may be produced at the low temperatures suggested by the prior art as well as normal temperature ranges. However, it is preferred that, by the use of this catalytic system, high molecular weight polyvinyl alkyl ethers be prepared at temperatures ranging from 0 to 120° C.

The catalyst which has been found useful when employed in room temperature polymerizations of vinyl alkyl ethers to form high molecular weight polyvinyl alkyl ethers is, as stated above, the reaction product of a hydrated ferric sulfate and sulfuric acid. A method of preparation of this catalyst is given below:

Ferric sulfate hexahydrate in the amount of 20 grams and concentrated sulfuric acid in the amount of 100 milliliters is placed in a suitable vessel and heated to 80° C. and allowed to remain at this temperature for 4½ hours. This mixture is cooled to room temperature and treated with diethyl ether. This treatment precipitates a white material from the reaction mixture. This white material is separated from the reaction mixture by filtration, washed with diethyl ether and dried under vacuum at approximately 25° C. A yield of 14 grams of a white powder containing 19.85% iron and 22.7% sulfur upon subsequent analysis is obtained. This iron and sulfur content within the limits of the experimental error of the analysis corresponds to an overall composition of ferric hydrosulfate trihydrate or ferric hydrosulfate tetrahydrate.

The alkyl vinyl ethers yielding high molecular weight rubber-like polymers of this invention when polymerized in the presence of this catalyst are the lower alkyl vinyl ethers such as methyl vinyl ether, ethyl vinyl ether, propyl vinyl ether, isopropyl vinyl ether, normal butyl vinyl ether, isobutyl vinyl ether and 2-ethyl hexyl vinyl ether.

In general polymers of these vinyl alkyl ethers may be obtained by polymerizing the vinyl alkyl ethers in the presence of the aforementioned catalyst either in solution or bulk.

The general procedure employed in solution polymerizations is to dissolve the vinyl alkyl ethers in an inert solvent or diluent. Care should bt exercised to exclude excessive moisture from the polymerization vessel, the monomers and the inert diluent. The required amount of catalyst is introduced into the monomer/diluent mixture. Since the reaction is somewhat exothermic, some method of removing this exothermic heat of reaction may be provided and the reaction vessel may be equipped with a stirring apparatus. When the reaction is completed or the desired conversion obtained the polymer formed is isolated and recovered by adding to the monomer/polymer/diluent mixture enough non-solvent for the polymer, for example, a water-alcohol mixture to precipitate the polymer from the mixture. The thus isolated polymer is dried in the manner according to normal practices to form a tough rubbery elastomeric high molecular weight material.

By the term inert solvent or diluent is meant that the solvent or diluent does not enter into the structure of the resulting polymer and does not adversely affect the desirable properties of the resulting polymers of the vinyl alkyl ethers. It is a means of controlling the heat of reaction and thereby does affect the rate of polymerization, usually the more solvent used the slower the rate of reaction, other things being equal. Examples of inert solvents or diluents useful in the practice of this invention are paraffinic hydrocarbons, such as pentane and hexane; aromatic hydrocarbons such as benzene; chlorinated paraffinic hydrocarbons such as dichloro-methane; chlorinated aromatic hydrocarbons such as chlorobenzene; aliphatic ethers such as diethyl ether and dibutyl ether; aliphatic esters such as ethyl acetate and amyl acetate; aliphatic ketones such as acetone and methyl ethyl ketone; and aliphatic nitrile compounds such as acetonitrile. Of these the paraffinic hydrocarbons such as pentane and hexane are preferred. It has been observed that the solvent to monomer ratio useful in the solution polymerization of these polymers may vary from 0:1 to 10:1 and even higher. However, no apparent advantage is obtained in a ratio greater than 10:1. It is preferred to use a solvent to monomer ratio ranging from 0.5:1 to 5:1.

In bulk polymerizations of the vinyl alkyl ethers of this invention, the monomer is generally placed in a suitable reaction vessel and the required amount of catalyst added, exercising care to exclude excessive amounts of moisture. An immediate reaction ensues which is highly exothermic, therefore, it is desirable to provide means to remove this exothermic heat of reaction. The polymer is recovered by dissolving the total mass of polymer and unreacted monomer in a solvent and then to reprecipitate the polymer by the addition of a non-solvent for the polymer in a manner similar to that used in solution polymerizations. The polymer is washed and dried in a manner according to normal practice.

The amount of catalyst required in the polymerization of vinyl alkyl ethers is not critical in this invention. The useful range may vary from 0.001 to 5% by weight of the catalyst based on the weight of the monomer. It has been found, however, that the preferred range is from 0.009 to 1% catalyst by weight based on the weight of the monomer.

These polyvinyl alkyl ethers of this invention have been found useful to form adhesives, coatings and the like.

The practice of this invention is further illustrated by the following examples in which all parts are reported by weight and are intended to be illustrative rather than restrictive of the practice and scope of this invention.

*Example 1*

A mixture of 50 milliliters of vinyl n-butyl ether (39 grams) and 500 milliliters of dry pentane was placed in a suitable reaction vessel equipped with a stirrer and a reflux condenser. Care was used to avoid excessive moisture. This mixture was stirred and heated to a temperature of 34° C. for ½ hour at which time the heating was stopped and 0.018 gram of catalyst (the reaction product of ferric sulfate hexahydrate and concentrated sulfuric acid) was added (preparation of this catalyst is shown above). At the end of 2 hours the reaction mixture was precipitated with methanol containing a small amount of phenyl beta naphthylamine as an antioxidant for the polymer (about 2% based on the weight of the polymer). The polymer was washed, dried and weighed following conventional procedures. A theoretical yield of 54% or 21 grams of polymer was obtained. A dilute solution viscosity measurement was made on a 0.10% solution of polymer dissolved in benzene resulting in a dilute solution viscosity of 1.7. A sample of this polymer was stretched and an X-ray diffraction pattern obtained. This X-ray diffraction pattern was a well-defined fiber diagram. This X-ray diffraction pattern showed evidence of crystallinity indicating that the polymer contained stereo regular chain segments.

*Example 2*

A mixture of 100 milliliters of pentane and 50 milliliters of vinyl n-butyl ether (39 grams) was placed in a suitable vessel and maintained with stirring at a temperature of 9° C. in the presence of 0.034 gram of catalyst previously described. The time of polymerization was 20 hours. Upon working up the polymer in a manner similar to that of Example 1 an almost quantitative yield was obtained. This polymer had a dilute solution viscosity of 5.44 when measured as a 0.1% solution in benzene.

*Example 3*

A mixture of 100 milliliters of pentane and 50 milliliters of vinyl-n-butyl ether was polymerized at 9° C. in the presence of 0.034 gram of catalyst previously described. At the end of the reaction time of 2¾ hours a quantitative yield of 15 grams of polymer was obtained. This corresponds to a theoretical yield of 38.5%.

*Example 4*

In a similar experiment to that of Example 3, except that 0.068 gram of catalyst previously described was used, resulting in a yield of 34.8 grams of dry elastomeric polymer which corresponds to a theoretical yield of 89.5%.

*Example 5*

A similar experiment to that of Example 3 was performed, except that 0.136 gram of catalyst previously described was used. This resulted in a yield of 34.4 grams of dry, rubber-like polymer corresponding to a theoretical yield of 88.5%.

*Example 6*

A similar experiment to that of Example 3 was performed, except that 250 milliliters of pentane was used and the reaction was allowed to continue for 4¼ hours. This resulted in a yield of 28.4 grams of rubber-like polymer which corresponds to a theoretical yield of 73%.

*Example 7*

A mixture of 200 milliliters of pentane and 50 milliliters of vinyl isobutyl ether was placed in a suitable reaction vessel and 0.034 gram of the catalyst previously described was added and reacted for 20 hours at 34° C. to a yield of 3 grams of polymeric material.

*Examples 8, 9 and 10*

A mixture of 100 milliliters of pentane and 0.068 gram of the catalyst previously described was cooled to −20° C. in a 4-ounce glass bottle equipped with a screw cap and a self-sealing gasket. Ten milliliters of vinyl-n-butyl ether was injected into the bottle and the bottle was tumbled in a 5.5° C. bath. A number of bottles were prepared in this manner. Bottles were withdrawn at various intervals listed below and the polymer precipitated in methanol containing approximately 2% phenyl beta naphthylamine based on the weight of polymer and the polymer then dried. The yields and dilute solution viscosity (D.S.V.) were obtained on each polymer.

| Time | Yield | D.S.V. |
| --- | --- | --- |
| 3 hours | 4.2 grams (53%) | 4.96 |
| 6 hours | 4.65 grams (59%) | 4.84 |
| 29 hours | 5.15 grams (65%) | 4.03 |

Specimens of each of these polymers were molded into strips at 225° F. and on stretching gave a well-defined fiber diagram on X-ray diffraction.

*Example 11*

Vinyl ethyl ether in the amount of 100 grams was polymerized by bulk polymerization technique as follows: The vinyl ethyl ether was placed in a 2-necked, 250 milliliter flask fitted with a reflux condenser and equipped with a stirrer. Care was taken to avoid excess moisture. Immediate reaction ensued when the catalyst comprising 0.009 gram of the catalyst previously described was added. Stirring was continued for 2 hours at which time the flask contained an almost solid mass of a mixture of polyvinyl ethyl ether and monomeric vinyl ethyl ether. This almost solid mass was dissolved in methanol and the polymer precipitated from the monomeric mixture by means of water. This polymer was dried, following conventional procedures, and resulted in 80 grams of a solid rubber-like material. When a sample of this polymer was subjected to X-ray diffraction, the resulting pattern showed evidence of crystallinity indicating that the polymer contained stereo regular chain segments.

*Example 12*

A similar experiment to that of Example 11 was performed except that 50 grams of vinyl 2-ethyl hexyl ether was used instead of vinyl ethyl ether and 0.068 gram of catalyst was used instead of 0.009 grams. Upon a similar treatment as that of Example 11 a yield of 15 grams of polyvinyl 2-ethyl hexyl ether was obtained.

Other rubber-like polymers of vinyl alkyl ethers may be prepared following the general procedures of the above examples by employing various other vinyl alkyl ethers such as methyl vinyl, propyl vinyl and isopropyl vinyl ethers and employing other inert diluents such as aromatic hydrocarbons, chlorinated paraffinic hydrocarbons, chlorinated aromatic hydrocarbons, aliphatic ethers, aliphatic esters, aliphatic ketones and aliphatic nitrile compounds. Other reaction temperatures and varying amounts of catalyst may also be employed to form these polymers. It should be understood that the specific compounds of vinyl alkyl ether, amount of catalyst employed, reaction temperature employed, and the inert diluent employed all have a bearing upon the ultimate molecular weight and/or theoretical yield of the rubber-like polymers obtained. The choice of each of these factors is well within the skill of a polymerization chemist.

It was unexpectedly observed that when samples of polyvinyl normal butyl ether were stretched and X-ray diffraction patterns obtained on these stretched samples a well-defined fiber diagram resulted. This well-defined fiber diagram of the X-ray diffraction patterns indicates that these polymers crystallize. This crystallinity illustrates that these polymers possess well ordered or stereo-regular polymer chains or spatially ordered molecular structure. Similarly, polyvinyl ethyl ether prepared by this catalyst also showed evidence of crystallinity indicating the presence of stereo-regular chain segments. Stereo-regular chain segments is intended to mean that side groups align themselves on one side of the chain or alternate from one side to the other in regular order.

I claim:

1. A process of polymerizing vinyl alkyl ethers to form high molecular weight polymers which comprises carrying out the polymerization of said vinyl alkyl ethers in the presence of a catalytic amount of a hydrate of ferric hydrosulfate corresponding to an overall composition of $$Fe_2(SO_4)_3 \cdot H_2SO_4 \cdot XH_2O$$

wherein X is a number not less than 3 nor more than 4.

2. In the process of polymerizing vinyl alkyl ethers the improvement comprising polymerizing the vinyl alkyl ethers in the presence of a catalytic amount of a hydrate of ferric hydrosulfate corresponding to an overall composition of $$Fe_2(SO_4)_3 \cdot H_2SO_4 \cdot XH_2O$$

wherein X is a number not less than 3 nor more than 4.

3. The process of polymerizing vinyl alkyl ethers to form high molecular weight polymers which comprises polymerizing the vinyl alkyl ethers in the presence of an inert organic diluent and a catalytic amount of a hydrate of ferric hydrosulfate corresponding to an overall composition of $$Fe_2(SO_4)_3 \cdot H_2SO_4 \cdot XH_2O$$

wherein X is a number not less than 3 nor more than 4.

4. A process of polymerizing vinyl alkyl ethers to form high molecular weight polymers which comprises carrying out the polymerization of the vinyl alkyl ethers in the presence of an inert organic diluent selected from the group consisting of paraffinic hydrocarbons, aromatic hydrocarbons, chlorinated paraffinic hydrocarbons, chlorinated aromatic hydrocarbons, aliphatic ethers, aliphatic esters, aliphatic ketones and aliphatic nitrile compounds and a catalytic amount of a hydrate of ferric hydrosulfate containing not less than 3 nor more than 4 mols of water of hydration.

5. The process according to claim 3 in which the hydrate of ferric hydrosulfate is present in an amount ranging from 0.001 to 5% by weight based on the weight of the vinyl alkyl ethers.

6. The process according to claim 2 in which the hydrate of ferric hydrosulfate is present in an amount ranging from 0.001 to 5% by weight based on the weight of the vinyl alkyl ethers.

7. The process according to claim 3 in which the hydrate of ferric hydrosulfate is present in an amount ranging from 0.009 to 1% by weight based on the weight of the vinyl alkyl ethers.

8. The process according to claim 1 in which the hydrate of ferric hydrosulfate is present in an amount ranging from 0.009 to 1% by weight based on the weight of the vinyl alkyl ethers.

9. The process according to claim 7 in which the vinyl alkyl ether is vinyl normal butyl ether.

10. The process according to claim 8 in which the vinyl alkyl ether is vinyl normal butyl ether.

11. The method of preparing a polyvinyl normal butyl ether which has stereo-regular chain segments which comprises polymerizing vinyl normal butyl ether in the presence of from 0.009 to 1% by weight of a hydrate of ferric hydrosulfate corresponding to an overall composition of:

$$Fe_2(SO_4)_3 \cdot H_2SO_4 \cdot XH_2O$$

wherein X is a number not less than 3 nor more than 4, based on the weight of the vinyl normal butyl ether.

12. The method of preparing a polyvinyl ethyl ether which has stereo-regular chain segments which comprises polymerizing vinyl ethyl ether in the presence of from 0.009 to 1% by weight of a hydrate of ferric hydrosulfate corresponding to an overall composition of $$Fe_2(SO_4)_3 \cdot H_2SO_4 \cdot XH_2O$$

wherein X is a number not less than 3 nor more than 4, based on the weight of the vinyl ethyl ether.

13. The process according to claim 7 in which the vinyl alkyl ether is vinyl 2-ethylhexyl ether.

14. The process according to claim 8 in which the vinyl alkyl ether is vinyl 2-ethylhexyl ether.

15. The process of polymerizing vinyl alkyl ethers to form high molecular weight polymers which comprises polymerizing the vinyl alkyl ethers in the presence of an inert organic diluent selected from the group consisting of paraffinic hydrocarbons, aromatic hydrocarbons, chlorinated paraffinic hydrocarbons, chlorinated aromatic hydrocarbons, aliphatic ethers, aliphatic esters, aliphatic ketones and aliphatic nitrile compounds and a hydrate of ferric hydrosulfate corresponding to an overall composition of a catalytic amount of $$Fe_2(SO_4)_3 \cdot H_2SO_4 \cdot XH_2O$$

wherein X is a number not less than 3 nor more than 4.

16. The process according to claim 12 in which the vinyl alkyl ether is vinyl normal butyl ether.

References Cited in the file of this patent

UNITED STATES PATENTS 2,549,921    Mosley  ---------------- Apr. 24, 1951

OTHER REFERENCES

Chem. abstracts, 45, page 5,374.